(12) United States Patent
Armstrong et al.

(10) Patent No.: US 7,055,860 B2
(45) Date of Patent: Jun. 6, 2006

(54) ELECTRICALLY ACTUATED STEERING COLUMN MECHANISM

(75) Inventors: Ray G. Armstrong, Bay City, MI (US); Richard K. Riefe, Saginaw, MI (US); Ravindra Jwalapathy, Saginaw, MI (US); Marvin V. Manwaring, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 65 days.

(21) Appl. No.: 10/184,695

(22) Filed: Jun. 27, 2002

(65) Prior Publication Data

US 2004/0000779 A1 Jan. 1, 2004

(51) Int. Cl.
B62D 1/18 (2006.01)
(52) U.S. Cl. .................. 280/775; 280/779; 74/497
(58) Field of Classification Search ............... 280/775, 280/779; 74/493, 497
See application file for complete search history.

(56) References Cited

U.S. PATENT DOCUMENTS

| | | | | |
|---|---|---|---|---|
| 3,978,740 A * | 9/1976 | Selzer | ...................... | 74/493 |
| 4,244,236 A * | 1/1981 | Sylvester | ..................... | 74/493 |
| 4,449,419 A * | 5/1984 | Soler Bruguera | ............ | 74/493 |
| 4,656,888 A * | 4/1987 | Schmitz | ........................ | 74/493 |
| 4,752,085 A | 6/1988 | Yamamoto | | |
| 5,029,489 A * | 7/1991 | Burmeister et al. | ........... | 74/493 |
| 5,035,446 A * | 7/1991 | Arvidsson | ................... | 280/775 |
| 5,259,264 A * | 11/1993 | Bodin et al. | ................... | 74/493 |
| 5,449,199 A * | 9/1995 | Heinrichs et al. | ........... | 280/775 |
| 5,485,376 A * | 1/1996 | Oike et al. | ............. | 364/424.05 |
| 5,520,416 A * | 5/1996 | Singer, III et al. | .......... | 280/775 |
| 5,524,927 A * | 6/1996 | Toussaint | ..................... | 280/777 |
| 5,562,306 A * | 10/1996 | Rispeter | ...................... | 280/775 |
| 5,606,891 A * | 3/1997 | Tisell et al. | ................... | 74/493 |
| 5,722,299 A * | 3/1998 | Yamamoto et al. | ........... | 74/493 |
| 5,787,759 A * | 8/1998 | Olgren | ......................... | 74/493 |
| 5,820,163 A * | 10/1998 | Thacker et al. | ............. | 280/775 |
| 5,829,311 A * | 11/1998 | Roberson | ..................... | 74/493 |
| 6,068,295 A * | 5/2000 | Skabrond et al. | ........... | 280/775 |
| 6,139,057 A * | 10/2000 | Olgren et al. | ................ | 280/775 |
| 6,189,405 B1 * | 2/2001 | Yazane | ......................... | 74/493 |
| 6,237,438 B1 | 5/2001 | Ben Rhouma et al. | | |
| 6,390,505 B1 * | 5/2002 | Wilson | ........................ | 280/775 |
| 6,419,269 B1 * | 7/2002 | Manwaring et al. | ........ | 280/775 |
| 6,616,185 B2 * | 9/2003 | Manwaring et al. | ........ | 280/775 |
| 6,659,504 B2 * | 12/2003 | Riefe | .......................... | 280/777 |
| 6,666,478 B2 * | 12/2003 | Livengood | .................. | 280/775 |
| 6,695,349 B2 * | 2/2004 | Bohlen et al. | .............. | 280/775 |
| 6,748,774 B2 * | 6/2004 | Dubay et al. | ................. | 70/187 |
| 6,761,376 B2 * | 7/2004 | Riefe et al. | ................. | 280/777 |

FOREIGN PATENT DOCUMENTS

JP 03 272528 12/1991

* cited by examiner

*Primary Examiner*—Gene O. Crawford
*Assistant Examiner*—Rashmi Sharma
(74) *Attorney, Agent, or Firm*—Michael D. Smith

(57) ABSTRACT

An electrically actuated steering column system that includes an electrically actuated steering column mechanism. A switch is interconnected with the electrically actuated steering column mechanism to allow for movement of a steering column housing relative to a driver. There is also included electrical control structure that regulates the electrically actuated steering column mechanism. The electrically actuated steering column system allows a driver to activate a switch and apply a force to initiate movement of the steering column housing and then deactivate the switch to halt movement and retain the steering column housing in a secure manner.

30 Claims, 5 Drawing Sheets

ELECTRICALLY ACTUATED STEERING COLUMN MECHANISM

TECHNICAL FIELD

This invention relates to an adjustable steering column, and more particularly, to an electrically actuated steering column.

BACKGROUND OF THE INVENTION

Steering columns currently in production with both a rake and telescope feature generally use a lever to lock and unlock the mechanism allowing movement of the steering column. Often, the lever utilized to unlock and lock the adjustment mechanism is placed on an underside of the steering column and is cumbersome to adjust by a driver.

Various positions of the lever currently used today are also necessary to accommodate left-hand and right-hand drivers. Often, because of the awkward position of such a lever, drivers may not lock the lever in position to maintain a position of a steering column.

There is, therefore, a need in the art for an electrically actuated steering column mechanism that will eliminate the need for a mechanical lever to unlock and lock a steering column.

SUMMARY OF THE INVENTION

An electrically actuated steering column system that includes an electrically actuated steering column mechanism. The mechanism is interconnected with a switch that may be toggled by a driver to allow movement of a steering column housing. There is also included appropriate electrical control structure for regulating the electrically actuated steering column mechanism. The electrically actuated steering column system allows a driver to activate the switch and apply a force to initiate movement of the steering column housing and then deactivate the switch to halt movement of the steering column housing.

The electrically actuated steering column mechanism includes a steering column housing, at least one movement bracket attached to the steering column housing, and a support plate associated with the at least one movement bracket. The support plate includes a cam. A rake bolt having first and second ends is positioned to intersect with the at least one movement bracket. There is also included an electrical actuator attached to the rake bolt at the first end allowing movement of the rake bolt to initiate a switching action whereby movement of a steering column housing relative to the driver is initiated and halted.

BRIEF DESCRIPTION OF THE DRAWINGS

These and other features and advantages of the present invention will become more readily appreciated when considered in connection with the following detailed description and appended drawings, where.

DETAILED DESCRIPTION OF THE PREFERRED EMBODIMENTS

Figure 1:
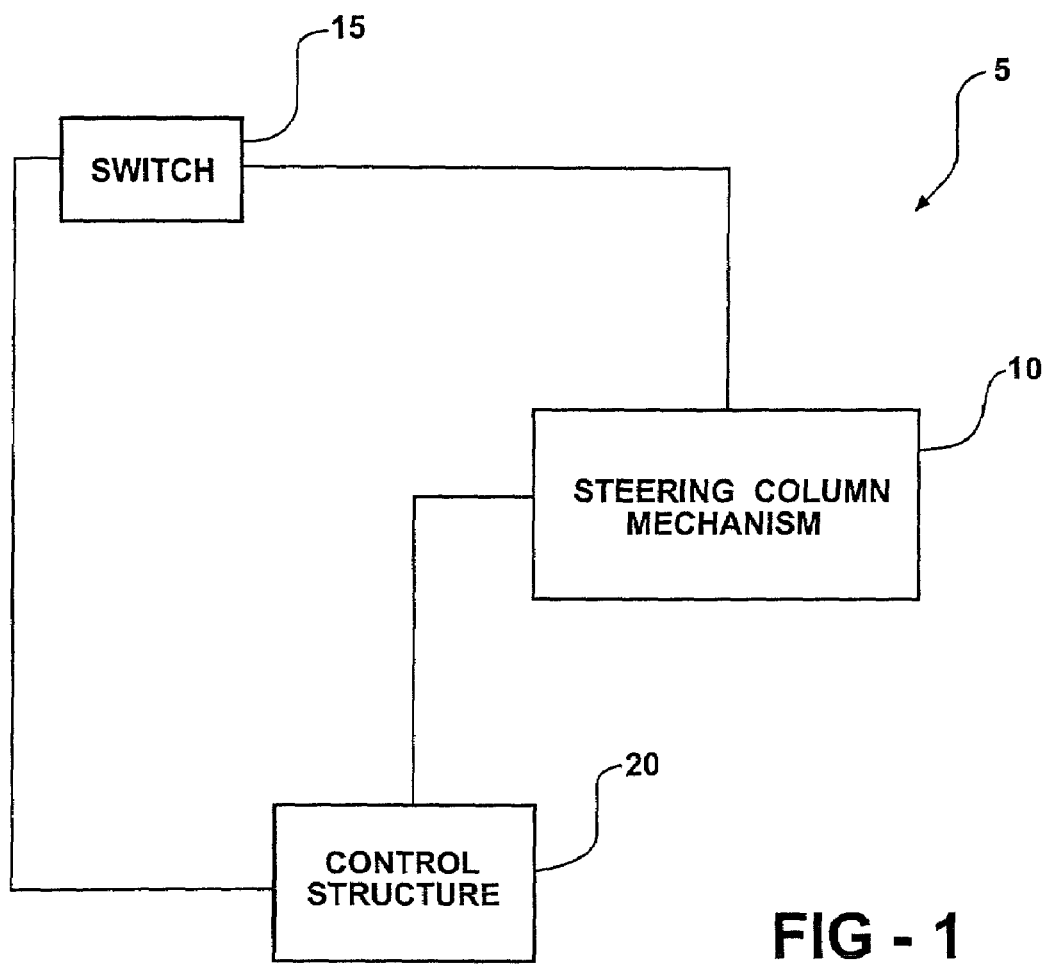
FIG. 1 is a diagram detailing the electrically actuated steering column system of the present invention.
Figure 5:
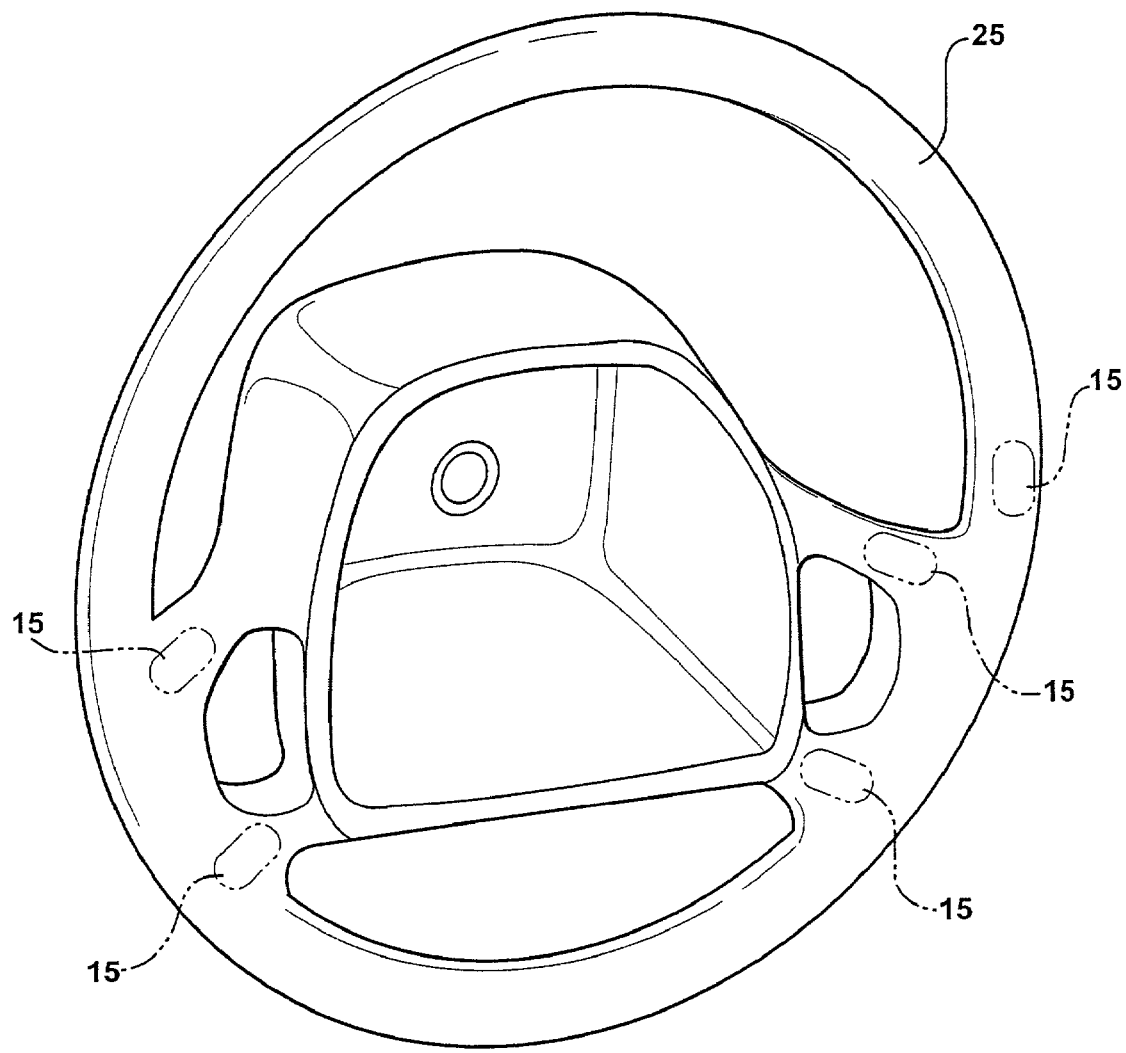
FIG. 5 is a perspective view of a steering hand wheel detailing locations for the switch of the electrically actuated steering column system of the present invention.

With reference to FIG. 1, there is shown an electrically actuated steering column system 5 according to the present invention. The electrically actuated steering column system 5 includes an electrically actuated steering column mechanism 10 and a switch 15 interconnected with the electrically actuated steering column mechanism 10 for allowing movement of a steering column housing 30 by a driver. The electrically actuated steering column system 5 also includes appropriate electrical control structure 20 for regulating the electrically actuated steering column mechanism 10. The electrically actuated steering column system 5 allows a driver to activate the switch 15 and apply a force to initiate movement of the steering column housing 30. The driver may then deactivate the switch 15 to halt movement of the steering column housing 30. In a preferred embodiment, the switch 15 is positioned on a steering hand wheel 25 as shown in FIG. 5.

Figure 2:
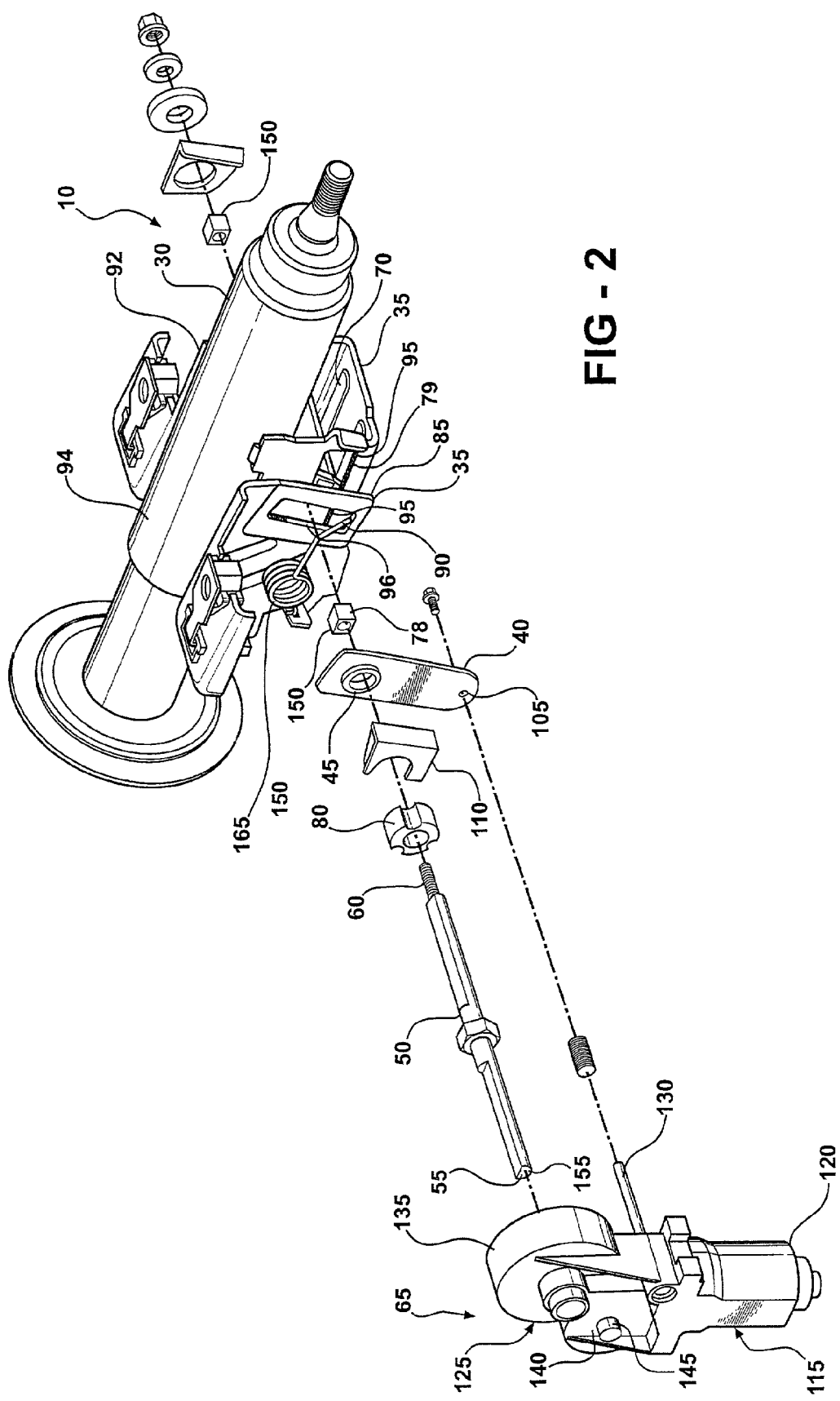
FIG. 2 is an exploded perspective view detailing a first embodiment of an electrically actuated steering column mechanism of the present invention.
Figure 3:
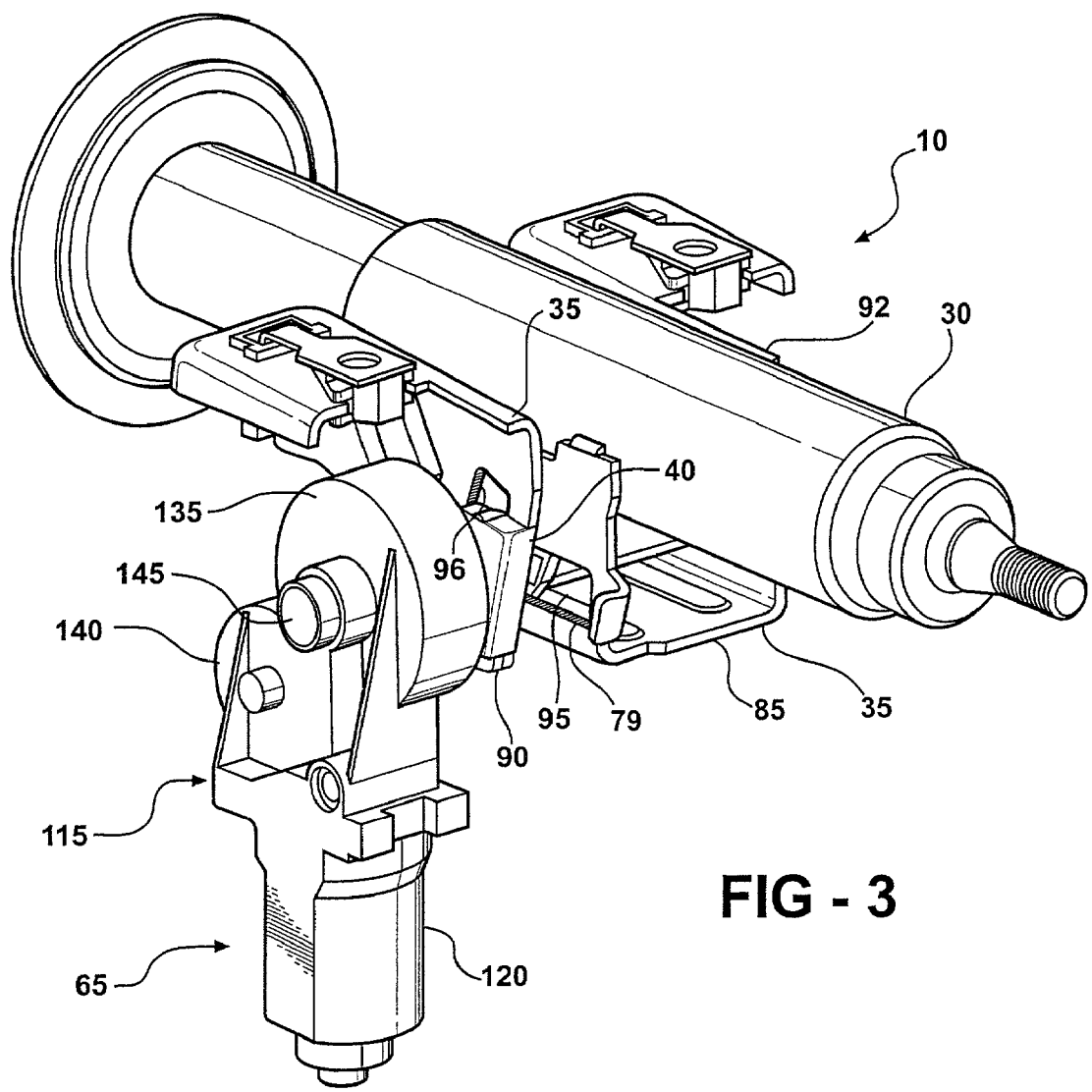
FIG. 3 is an assembled perspective view of the first embodiment of the electrically actuated steering column mechanism of the present invention.

With reference to FIGS. 2 and 3, there is shown a first embodiment of the electrically actuated steering column mechanism 10 of the present invention. The first embodiment is designed for use in a steering column that has the ability to be adjusted in a raking and telescoping manner. The electrically actuated steering column mechanism 10 includes a steering column housing 30. At least one movement bracket 35 is attached to the housing 30, and allows for movement of the steering column housing 30 relative to a driver. A support plate 40 is associated with the at least one movement bracket 35. The support plate 40 includes a cam 45 for engaging and disengaging the electrically actuated steering column mechanism 10. A rake bolt 50 is positioned such that it intersects with the at least one movement bracket 35. The rake bolt 50 has first 55 and second 60 ends. An electric actuator 65 is attached to the rake bolt 50 at the first end 55 and allows for moving the rake bolt 50. Movement of the rake bolt 50 allows a switching action whereby movement of the steering column housing 30 relative to a driver is initiated and halted.

As stated above, the first embodiment of the electrically actuated steering column mechanism 10 is designed for use with a rake and telescoping steering column. The at least one movement bracket of the first embodiment preferably comprises a mounting bracket 85 and a rake bracket 90 both of which are attached to the steering column housing 30. The mounting bracket 85 is generally a U-shaped member attached at an underside of the steering column housing. The mounting bracket 85 has slots 95 formed on opposite sides 100. The slots 95 allow the rake bolt 50 to pass through. The electrically actuated steering column mechanism 10 of the first embodiment includes a second rake bracket 92 attached to the steering column housing 30 on an opposite side 94 of the steering column housing 30 relative to a first rake bracket 90 thereby creating a symmetrical orientation. In this manner, the steering column housing 30 can maintain a uniform collapse stroke during a crash.

The electrically actuated steering column mechanism 10, of the first embodiment includes a cam insert 80 disposed about the rake bolt 50 to facilitate increasing or decreasing a compression force to allow for movement of the steering column housing 30 relative to a driver. A more detailed description of the interaction of the rake bolt 50 and cam 45 will be discussed below.

The cam 45 of the support plate 40 may be formed integrally with the support plate 40 or be a piece that is connected with the support plate 40. For example, a bore 105 may be formed within the support plate 40 in which a cam 45 is press fit. The manner of forming the cam 45 in the support plate 40 is not critical and alternative means of forming cams within the support plate 40 can be utilized without departing from the inventive aspect of the mechanism. The support plate 40 also preferably includes a cam guide 110 attached therewith. The cam guide 110 aligns the cam insert 80 with the cam 45 formed in the support plate 40. As can be seen in FIG. 2, the cam guide has a shape corresponding to the cam insert 80 to prevent misalignment of the cam insert 80 with the cam 45.

The electrically actuated steering column mechanism of the first embodiment also includes an electric actuator 65 that comprises an electric motor assembly 115. The electric motor assembly 115 comprises an electric motor 120, gearing 125 for transferring the rotary motion of the electric motor 120, and a mounting rod 130 for attaching the electric motor assembly 115 to the support plate 40. The gearing 125 associated with the electric motor assembly 115 comprises a partial gear 135 that is meshed with a gear 140 that is connected to the electric motor 120. The first end 55 of the rake bolt 50 is connected to the partial gear 135 for providing movement to the rake bolt 50. A limiting switch 145 is associated with the partial gear 135 to stop rotation of the partial gear 135 corresponding to initiating and halting movement of the steering column housing 30 relative to a driver.

The electric actuator 65, as described in the first embodiment need not be directly attached to the rake bolt 50, as described above. The actuator 65 can be placed at other positions on the steering column housing 30 and the rotary motion transmitted to the rake bolt 50 and the cam insert 80 through a belt and pulley drive, a chain and sprocket drive or a screw rod and crank without departing from the inventive aspect of the mechanism. Also, the cam 45 and cam insert 80 may be replaced by a multiple lead screw rod that may be turned by the electric actuator 65 to clamp the mounting bracket 85 and increase or decrease the compression force as described above.

In a preferred aspect of the present invention, the rake bolt 50 includes a locking portion 150 circumferentially disposed thereon for interacting with the mounting 85 and rake brackets 90, 92. In a preferred embodiment, two locking portions 150 are disposed about the rake bolt 50 to interact with the symmetrically positioned mounting bracket 85 and rake brackets 90 and 92, as previously described. As stated above, the mounting bracket 85 includes slots 95 formed on opposite sides 100 of the mounting bracket, to allow for passage of the rake bolt 50. The slots, in a preferred aspect, include serrations 79 formed along a bottom edge of the slot such that they engage with teeth 78 formed on the locking portion 150. The rake brackets 90, 92 also include serrations 96 formed on an edge of the slot, again to mesh with the teeth 78 formed on the locking portion 150 during a collision. The teeth 78 formed on the locking portion 150 and the serrations 79, 96 formed on the mounting 85 and rake brackets 90, 92 provide a positive locking feature designed to move the steering column housing 30 in a uniform manner along a collapse stroke, during a collision. The first end 55 of the rake bolt 50 may include a shaped portion 155 that mates with the electric motor assembly 115. The shaped portion 155 can be square, keyed, any other shape that is designed to mesh with the partial gear 135 of the electric motor assembly 115.

As another aspect of the first embodiment of the electrically actuated steering column mechanism 10 of the present invention, there may be included a spring 165 associated with the support plate 40 that allows for movement of the electric motor assembly 115 corresponding to movement of the steering column housing 30. In this manner, the electric motor assembly 115 is allowed to move relative to the steering column housing 30 while maintaining a connection with the rake bolt 50. The spring 165 is attached at a first end with the support plate 40 and at a second end to the electric motor assembly 115.

In another aspect of the first embodiment of the present invention, a positioning spring 70 may be disposed between the mounting bracket 85 and the steering column housing 30 for applying a constant biasing force that returns the steering column housing 30 to an initial position 75 when a force is not applied by the driver to move the steering column housing 30. In this manner, when the electrically actuated steering column mechanism is initiated to allow movement of the steering column housing 30, the default position of fully telescoped in the most upward rake position will allow a driver to exit a vehicle without having to apply a force to the steering column housing 30.

As described above with reference to the electrically actuated steering column system 5, a door switch, as opposed to the switch 15, may be included in a driver door such that when a vehicle is shutoff and the driver opens a door to exit, the electrically actuated steering column mechanism 10 is initiated to allow movement of the steering column housing 30. The positioning spring 70 then applies a force to the rake bracket returning the steering column housing 30 to an initial position 75, as detailed above.

In use, as the switch 15 of the electrically actuated steering column system 5 is depressed by a driver, the electrically actuated steering column mechanism 10 allows movement of a steering column housing 30 relative to the driver. Electrical control structure 20 regulates the electrically actuated steering column mechanism 10 to initiate and halt movement of the steering column housing 30.

Specifically, when the switch 15 is depressed by a diver, the electric motor 120 of the electric motor assembly 115 turns a gear 140 that is meshed with a partial gear 135. The first end 55 of the rake bolt 50 is connected with the partial gear 135 such that the rake bolt 50 is turned in a rotary manner. The cam insert 80 disposed about the rake bolt 50 engages the cam 45 of the support plate 40 such that the compression force placed on the electrically actuated steering column mechanism 10 is decreased to allow movement of the steering column housing 30 relative to the driver. In other words, depressing the switch 15 moves the components that cooperate to frictionally lock the column mechanism 10 against adjustment to an "unlocked" position by releasing the frictional bonding force applied to the column mechanism 10. The control structure deactivates the electric motor 120 once rotation of the rake bolt 50 has sufficiently reduced the compression force to allow movement of the steering column housing 30. When the switch 15 is released by the driver, the control structure 20 again initiates the electric motor 120 turning the rake bolt 50 in an opposite direction to again apply a compression force to the electrically actuated steering column mechanism 10 such that movement of the steering column housing 30 relative to a driver is halted. In other words, releasing the switch 15 moves the frictional locking device back to its locked position to prevent adjustment of the column mechanism 10. In this manner, a driver can simply depress a switch 15 to unlock the column for adjustment and release the switch 15 to restore the column 10 to a locked condition, thereby allowing slideable movement of the steering column housing 30 without the use of a lever as is commonly utilized in the art.

Figure 4:
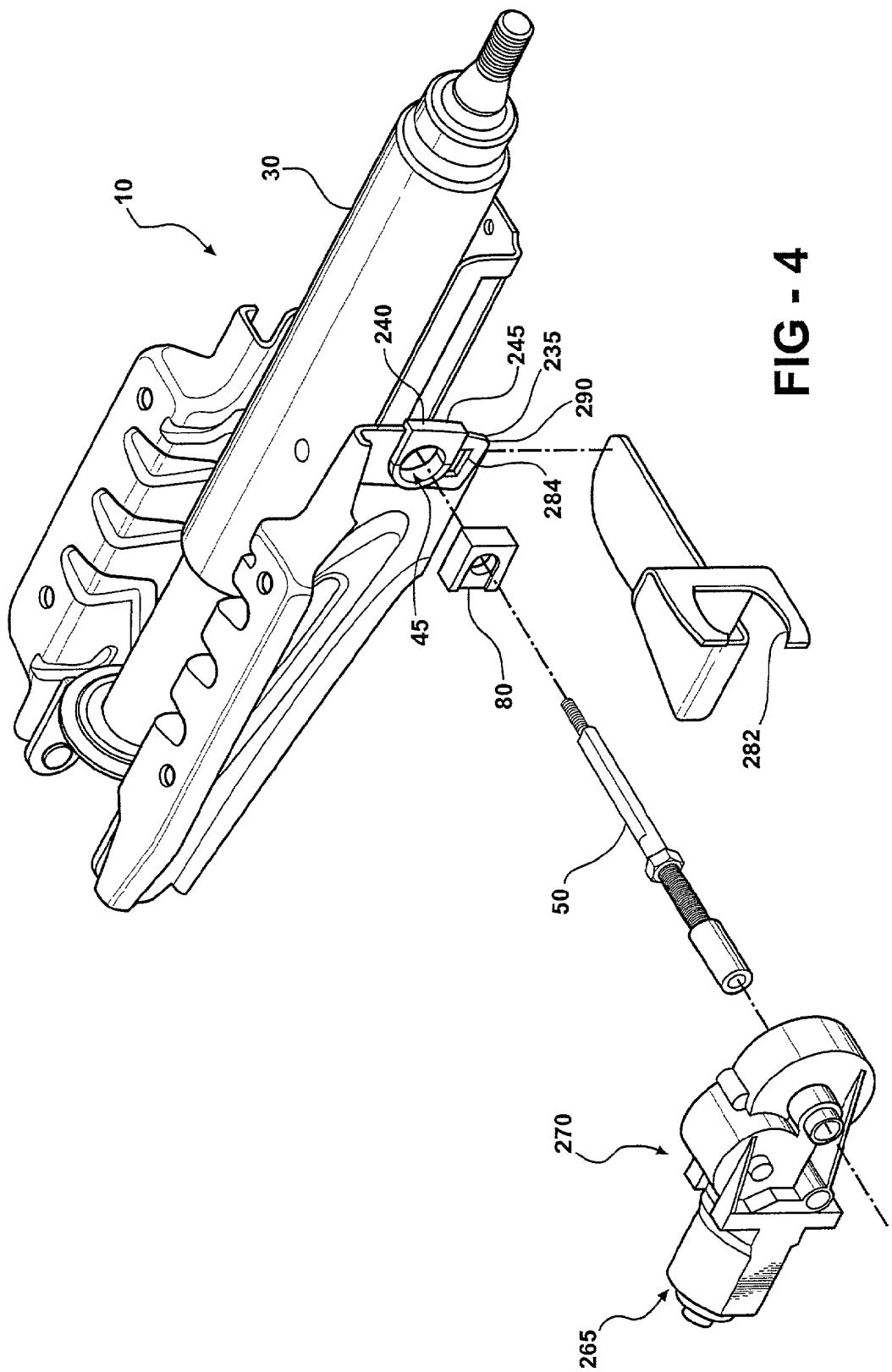
FIG. 4 is an exploded perspective view detailing a second embodiment of the electrically actuated steering column mechanism of the present invention.

With reference to FIG. 4, there is shown a second embodiment of the electrically actuated steering column mechanism 10 of the present invention. The second embodiment includes a design for a steering column that is adjustable only in a raking manner and does not include a telescoping feature. Therefore, the at least one movement bracket 235 comprises a rake bracket 290 only. The support plate 240 of the second embodiment is attached to the rake bracket 290 and includes a cam 45 just as with the previously described first embodiment. Again, a cam insert 80 is disposed over a rake bolt 50 to interact with the cam 45 to increase and decrease a compressive force, as previously described with reference to the first embodiment. With reference to FIG. 4, it can be seen that the support plate 240 of the second embodiment includes a flange 245 that engages the rake bracket 290 such that the support plate 240 can move relative to the rake bracket 290. The second embodiment also includes an electric actuator 265 that comprises an electric motor assembly 270. The electric motor assembly 270 is similar in respect to that of the previously described first embodiment with the exception that the electric motor assembly 270 does not include a mounting rod, as the support plate 240 is attached to the rake bracket 290. The electric motor assembly 270 of the second embodiment otherwise operates in a similar fashion to that of the first embodiment previously described. The electric motor assembly of the second embodiment, is however attached to the rake bracket 290 utilizing a motor mounting bracket 280. The motor mounting bracket 280 includes a C-shaped slot 282 that allows for the motor assembly to move while the motor mounting bracket 280 is permanently secured to a portion of the vehicle structure. In this manner, the motor assembly 270 is free-floating within the C-shaped slot to allow for movement of the rake bolt 50 within the slot 284 formed in the rake bracket 285.

While preferred embodiments are disclosed, a worker in this art would understand that various modifications were to come within the scope of the invention. Thus, the following claims should be studied to determine the scope and content of this invention.

What is claimed is:

1. An electrically actuated steering column mechanism comprising:
    a steering column housing:
    at least one movement bracket attached to the steering column housing;
    a support plate associated with the at least one movement bracket, the support plate including a cam;
    a rake bolt positioned to move into and out of locking engagement with the at least one movement bracket, the rake bolt having first and second ends;
    an electric actuator comprising an electric motor assembly attached to the rake bolt at the first end, the electric actuator moving the rake bolt into and out of said locking engagement with the at least one movement bracket, wherein said steering column housing is moveable when the rake bolt is out of said locking engagement without assistance from the electric actuator.

2. The electrically actuated steering column mechanism of claim 1 further including a cam insert disposed about the rake bolt and interacting with the cam.

3. The electrically actuated steering column mechanism of claim 1 wherein the at least one movement bracket comprises a mounting bracket and a rake bracket attached to the steering column housing.

4. The electrically actuated steering column mechanism of claim 3 wherein the mounting bracket and rake bracket include slots formed therein for allowing the rake bolt to pass through.

5. The electrically actuated steering column mechanism of claim 3 wherein the mounting bracket has a symmetrical shape including slots formed on opposite sides thereof, allowing the rake bolt to pass through.

6. The electrically actuated steering column mechanism of claim 1 including a second rake bracket attached to the steering column housing on an opposite side of the steering column housing relative to a first rake bracket, creating a symmetrical orientation.

7. The electrically actuated steering column mechanism of claim 1 wherein the cam is formed integrally with the support plate.

8. The electrically actuated steering column mechanism of claim 1 wherein the cam is press fit into a bore formed within the support plate.

9. The electrically actuated steering column mechanism of claim 1 wherein the support plate includes a cam guide associated therewith.

10. The electrically actuated steering column mechanism of claim 1 wherein the electric motor assembly comprises an electric motor, gearing for transferring the rotary motion of the electric motor, and a mounting rod for attaching the electric motor assembly to the support plate.

11. The electrically actuated steering column mechanism of claim 10 wherein the gearing comprises a partial gear meshed with a gear connected to the electric motor.

12. The electrically actuated steering column mechanism of claim 11 wherein the rake bolt is connected to the partial gear for providing movement to the rake bolt.

13. The electrically actuated steering column mechanism of claim 11 wherein the motor assembly further includes a limiting switch associated with the partial gear for stopping rotation of the partial gear.

14. The electrically actuated steering column mechanism of claim 3 wherein the rake bolt includes a locking portion circumferentially disposed thereon for interacting with the mounting and rake brackets.

15. The electrically actuated steering column mechanism of claim 6 wherein two locking portions are disposed about the rake bolt to interact with the symmetrically positioned mounting bracket and rake brackets.

16. The electrically actuated steering column mechanism of claim 1 wherein the first end of the rake bolt includes a shaped portion for mating with the electric motor assembly.

17. The electrically actuated steering column mechanism of claim 10 wherein the support plate includes a bore formed therein corresponding to a location of the mounting rod of the electric motor assembly.

18. The electrically actuated steering column mechanism of claim 10 further including a spring associated with the support plate allowing for movement of the electric motor assembly corresponding to movement of the steering column housing.

19. The electrically actuated steering column mechanism of claim 1 further including a positioning spring positioned between the rake bracket and the steering column housing for applying a constant biasing force that constantly urges the steering column housing toward a predetermined initial position.

20. The electrically actuated steering column mechanism of claim 1 wherein the at least one movement bracket comprises a rake bracket.

21. The electrically actuated steering column mechanism of claim 20 wherein the support plate is attached to the rake bracket.

22. The electrically actuated steering column mechanism of claim 20 wherein the electric actuator comprises an electric motor assembly.

23. The electrically actuated steering column mechanism of claim 22 further including a motor mounting bracket for attaching the electric motor assembly to the rake bracket.

24. The electrically actuated steering column system of claim 1 wherein the switch is positioned on a steering hand wheel.

25. An electrically actuated steering column system comprising:
   an electrically actuated steering column mechanism;
   a switch interconnected with the electrically actuated steering column mechanism for allowing movement of a steering column housing by a driver;
   electrical control structure for regulating the electrically actuated steering column mechanism;
   the electrically actuated steering column system allowing a driver to activate the switch and apply a force to initiate movement of the steering column housing and deactivate the switch to halt movement of the steering column housing wherein the electrically actuated steering column mechanism comprises:
   a steering column housing;
   at least one movement bracket attached to the steering column housing;
   a support plate associated with the at least one movement bracket, the support plate including a cam;
   a rake bolt positioned to intersect with the at least one mounting bracket, the rake bolt having first and second ends;
   an electric actuator attached to the rake bolt at the first end, the electric actuator moving the rake bolt allowing a switching action whereby movement of the steering column housing relative to the driver is initiated and halted,
   wherein the electrically actuated steering column mechanism further includes a positioning spring positioned between the rake bracket and the steering column housing for applying a constant biasing force that returns the steering column housing toward a predetermined initial position.

26. The electrically actuated steering column system of claim 25 further including a switch associated with a driver door whereby opening the driver door initiates movement of the rake bolt allowing movement of the steering column housing and wherein the positioning spring moves the steering column housing to the initial position.

27. A steering column mechanism, comprising:
   a steering column supporting a hand wheel;
   support structure mounting said column to vehicle support structure for selective movement between different positions of adjustment;
   a frictional locking device acting between the support structure and steering column and moveable between a locked position in which a frictional binding force acts between the steering column and support structure to prevent said movement of the column between positions of adjustment, and an unlocked position in which said frictional binding force is released to enable said movement of the column between said positions of adjustment without assistance from said frictional locking device; and
   an electric actuator coupled to said frictional locking device and including an actuator switch mounted on said hand wheel and operative when said switch is depressed to move said frictional locking device to said unlocked position and further operative when said switch is released to move said frictional locking device to said locked position.

28. The mechanism of clam 27 wherein the column mechanism is telescope-adjustable.

29. The mechanism of claim 27 wherein the column mechanism is rake-adjustable.

30. The mechanism of claim 27 wherein the column mechanism is both telescope-adjustable and rake-adjustable.

* * * * *